United States Patent
Yeom

(10) Patent No.: US 7,706,385 B2
(45) Date of Patent: Apr. 27, 2010

(54) BANDWIDTH MANAGEMENT SYSTEM AND METHOD FOR GUARANTEEING QUALITY OF SERVICE IN VOICE OVER INTERNET PROTOCOL NETWORK

(75) Inventor: Eung-Moon Yeom, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 921 days.

(21) Appl. No.: 11/451,411

(22) Filed: Jun. 13, 2006

(65) Prior Publication Data

US 2007/0025249 A1 Feb. 1, 2007

(30) Foreign Application Priority Data

Jul. 13, 2005 (KR) ...................... 10-2005-0063444

(51) Int. Cl.
*H04L 12/56* (2006.01)
*H04L 12/28* (2006.01)
*G06F 11/00* (2006.01)

(52) U.S. Cl. .............................. 370/395.41; 370/230.1; 370/235; 370/352; 370/401

(58) Field of Classification Search .......... 370/230–468
See application file for complete search history.

(56) References Cited

U.S. PATENT DOCUMENTS

| 6,426,942 | B1 | 7/2002 | Sienel et al. |
| 6,529,499 | B1 * | 3/2003 | Doshi et al. ................. 370/352 |
| 6,907,004 | B1 | 6/2005 | Ramsey et al. |
| 2002/0181401 | A1 | 12/2002 | Hagirahim et al. |
| 2006/0045074 | A1 | 3/2006 | Lee |

FOREIGN PATENT DOCUMENTS

EP 0 999 674 5/2000

OTHER PUBLICATIONS

Signaling gateway http://en.wikipedia.org/wiki/Signaling_gateway.

* cited by examiner

*Primary Examiner*—Afsar M. Qureshi
(74) *Attorney, Agent, or Firm*—H. C. Park & Associates, PLC

(57) ABSTRACT

In a bandwidth management system and method for guaranteeing quality of service (QoS) in a Voice over Internet protocol (VoIP) network, bandwidth use information used to establish or terminate a call is provided, a bandwidth is reset when the bandwidth use information is provided, and available bandwidth information which is changed according to the reset bandwidth is reported.

15 Claims, 4 Drawing Sheets

BANDWIDTH MANAGEMENT SYSTEM AND METHOD FOR GUARANTEEING QUALITY OF SERVICE IN VOICE OVER INTERNET PROTOCOL NETWORK

CLAIM OF PRIORITY

This application makes reference to, incorporates the same herein, and claims all benefits accruing under 35 U.S.C. §119 from an application for BANDWIDTH MANAGEMENT SYSTEM AND METHOD FOR GUARANTEEING QUALITY OF SERVICE IN VOICE OVER INTERNET PROTOCOL NETWORK filed in the Korean Intellectual Property Office on 13 Jul. 2005 and there duly assigned Serial No. 10-2005-0063444.

BACKGROUND OF THE INVENTION

1. Technical Field

The present invention relates to a bandwidth management system and method for guaranteeing quality of service (QoS) in a Voice over Internet protocol (VoIP) network.

2. Related Art

VoIP is a communication technology which provides voice telephone service, multimedia video conference service, and the like using an Internet protocol (IP), and is applicable to various devices and application services on IP networks and public switched telephone networks (PSTNs).

Methods for guaranteeing quality of service (QoS) of such Voice over Internet protocol (VOIP) services include congestion control, queue management, type of service (ToS) processing, and the like.

The QoS guaranteeing method using congestion control avoids congestion occurring due to the presence of various traffic on the network. An IP address and a port number to be processed should be first set in order to avoid congestion.

In the QoS guarantee method using queue management, packets are collected in a queue and are sent to a buffer on a transmission link using a scheduling method. Packets requiring guaranteed QoS must be put in a first queue. To this end, an IP address and port number used for a service requiring guaranteed QoS should be set in advance.

In the QoS guarantee method using ToS processing, a class of service (CoS) for each packet is determined using priority of three bits of a ToS field included in a packet sent to the network. In other words, a predefined IP address and port number should be known in order to determine the priority of three bits of the ToS field.

As described above, in the QoS guarantee methods using congestion control, queue management and ToS processing, the IP address and port number for a service requiring guaranteed QoS should be statically preset by a device manager.

Similarly, in congestion control, queue management and ToS processing used to provide guaranteed QoS in VoIP service, ranges of an IP address and port number for the VoIP service should be statically set. However, this is inconvenient because it is necessary to know port allocation policies for VoIP service of several manufacturing companies when VoIP terminals available from the manufacturing companies are used.

When the statically set IP address is used in both VoIP service and IP application service (e.g., file transfer protocol (FTP) or Telnet) as described above, QoS in the VoIP service cannot be guaranteed.

In other words, since the VoIP service and the IP application service requiring guaranteed QoS are based on one statically set IP address, congestion control, queue management, and ToS processing for the VoIP service are not performed. Therefore, QoS in the VoIP service cannot be guaranteed.

In particular, a conventional switch/router having a traffic management function uses a technique by means of which a bandwidth for strict priority queuing (SPQ) is statically set for a specific IP/port for the VoIP service in advance according to, for example, a ratio of a possible simultaneous call number to a total user number.

However, although the bandwidth is set in advance by calculating the number of simultaneous calls, the bandwidth for each VoIP call varies with codec negotiation, which is a characteristic of the VoIP call. Therefore, it is difficult to set an accurate bandwidth.

In SPQ and weight round robin (WRR) used together for real time data service and general data service, the bandwidth used by the SPQ is continuously used for the VoIP service, resulting in a limitation on effective traffic management.

When traffic bandwidth which can be processed by the switch/router is exceeded, a buffer manager's drop function is used, but bypass call service via a legacy trunk of an IP-private branch exchanger (PBX) is not considered.

SUMMARY OF THE INVENTION

It is an object of the present invention to provide a bandwidth management system and method for guaranteeing QoS in a VoIP network, the system and method being capable of dynamically setting a bandwidth and, if the bandwidth exceeds a bandwidth limit, establishing a requested call via an IP-PBX legacy trunk when VoIP call service is provided.

According to an aspect of the present invention, a bandwidth management system for guaranteeing QoS in a VoIP network comprises: a call controller for providing bandwidth use information used in order to establish or terminate a call; and a traffic (or bandwidth) manager for resetting the bandwidth when the bandwidth use information is provided by the call controller, and for sending variable available bandwidth information to the call controller.

The call controller processes a call which is newly generated according to the available bandwidth information sent by the traffic manager in real time.

The call controller includes a call bypass processor for bypassing the newly generated call to a legacy trunk so as to process the call when the available bandwidth sent by the traffic manager in real time exceeds a predetermined bandwidth limit.

The traffic manager includes: a traffic classifier for classifying data traffic inputted through an IP network according to at least one of data traffic characteristics, IP/port/protocol information and ToS information; a traffic buffer manager for storing the data traffic classified by the traffic classifier in a corresponding queue; and a traffic queue scheduler for differentially scheduling the data traffic stored in the queue of the traffic buffer manager according to a queuing algorithm, and for sending the scheduled data traffic to an output port according to a priority.

The traffic manager includes a queue manager for processing real-time data traffic using the SPQ method, and then processing general data traffic using the WRR method.

According to another aspect of the present invention, a bandwidth management method for guaranteeing QoS in a VoIP network comprises: providing use bandwidth information in order to establish or terminate a call; and resetting a bandwidth when the use bandwidth information is provided, and providing available bandwidth information which is changed according to the reset bandwidth.

The bandwidth management method may further include processing a newly generated call according to the available bandwidth information sent in real time.

The bandwidth management method may further include bypassing the newly generated call to a legacy trunk in order to process the call when the available bandwidth sent in real time exceeds a predetermined bandwidth limit.

In the step of bypassing the newly generated call to the legacy trunk and processing the call, when a call which is previously being served is terminated, and thus the available bandwidth is extended, the newly generated call is not bypassed, but is processed by a normal call control service method.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
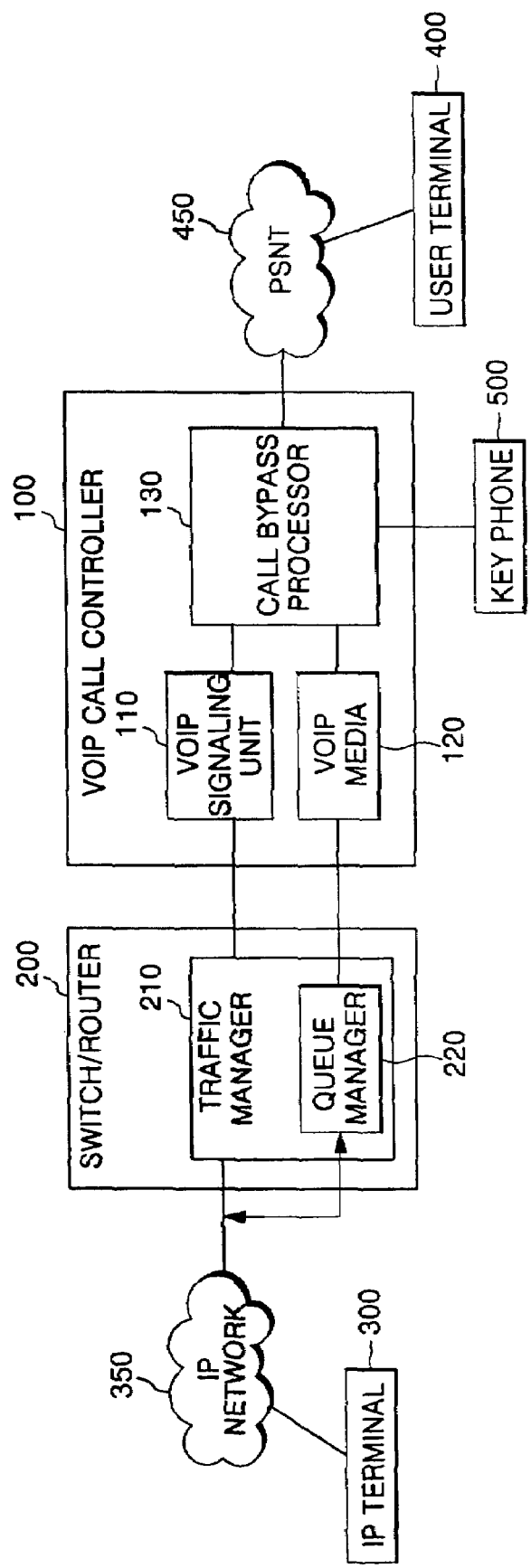
FIG. 1 is a block diagram of a bandwidth management system for guaranteeing quality of service (QoS) in a voice over Internet protocol (VoIP) network according to an exemplary embodiment of the present invention.

Hereinafter, exemplary embodiments of the present invention will be described in detail with reference to the accompanying drawings. Like elements are denoted by like reference numerals throughout the drawings. Matters related to the present invention and well-known in the art will not be described in detail when such a description will detract from the clarity and concision of the disclosure.

Figure 2:
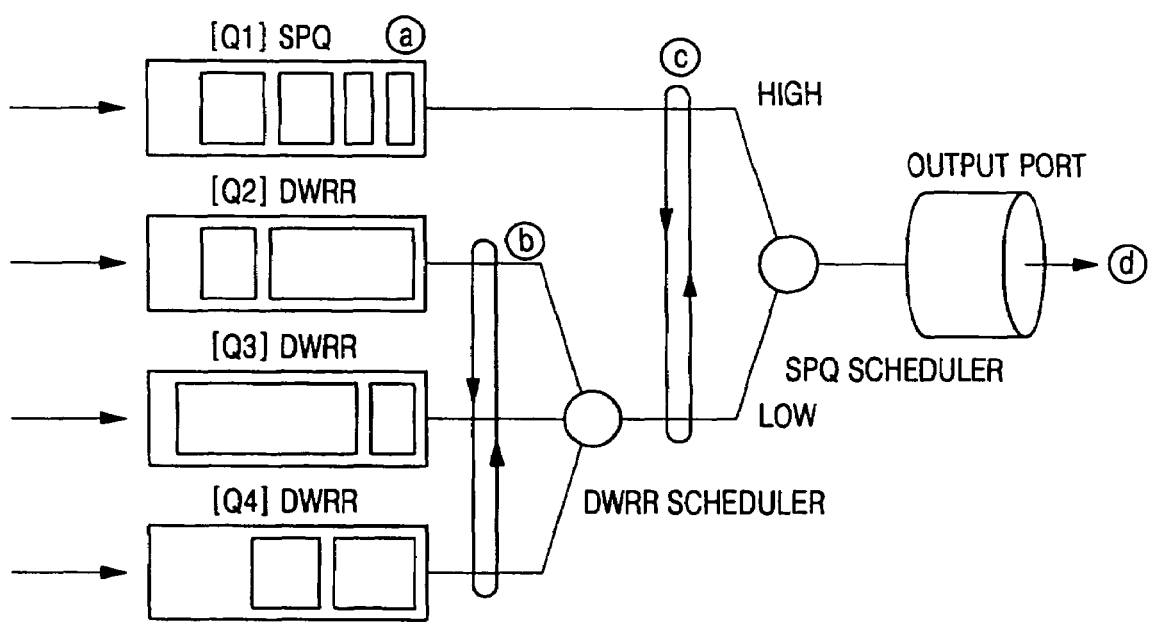
FIG. 2 illustrates a queuing management operation of a queue manager shown in FIG. 1.

FIG. 1 is a block diagram of a bandwidth management system for guaranteeing quality of service (QoS) in a voice over Internet protocol (VOIP) network according to an exemplary embodiment of the present invention, and FIG. 2 illustrates a queuing management operation of a queue manager shown in FIG. 1.

As illustrated in FIG. 1, the bandwidth management system comprises a VoIP call controller 100, a switch/router 200, an Internet protocol (IP) terminal 300 connected to an IP network 350, a user terminal 400 connected to a public switched telephone network (PSTN) 450, and a key phone 500 having a connection to an office line and/or an extension.

When a VoIP call service is provided, the VoIP call controller 100 notifies the switch/router 200 taking charge of traffic management of available bandwidth determined by VoIP codec negotiation.

The VoIP call controller 100 includes a VoIP signaling unit 110, a VoIP media 120, and a call bypass processor 130.

When a call is initiated between the IP network 350 and the PSTN 450, the VoIP signaling unit 110 performs appropriate signaling conversion for each network. Specifically, when the IP terminal 300 connected to the IP network 350 requests call setup to the user terminal 400 connected to the PSTN 450, the VoIP signaling unit 110 converts VoIP signaling to appropriate signaling for the PSTN 450. Conversely, when the user terminal 400 connected to the PSTN 450 requests call setup to the IP terminal 300 connected to the IP network 350, the VoIP signaling unit 110 converts signaling received from the PSTN 450 to VoIP signaling.

In particular, when there is a request for a call connection, the VoIP signaling unit 110 notifies a traffic manager 210 of the switch/router 200, as described below, of use bandwidth information according to a compression method and a number of frames by referring to Table 1 provided below.

In addition, even when a requested call is terminated, the VoIP signaling unit 110 also notifies the traffic manager 210 of the switch/router 200 of use bandwidth information according to a compression method and a number of frames by referring to Table 1.

Thereby, the VoIP signaling unit 110 is informed of available bandwidth information by the traffic manager 210 in the switch/router 200 in real time whenever a call is set up or terminated, and thus the VoIP signaling unit 110 can process a newly requested call.

In this regard, when an available bandwidth is too small to normally process the newly requested call, the VoIP signaling unit 110 performs bypass processing via the PSTN 450. When a previously connected call is terminated during the bypass processing, the VoIP signaling unit 110 processes the requested call using the normal method again.

TABLE 1

| Codec/<br>Frame<br>Count | G.711<br>(40 bytes/<br>5 msec) | | G.723.15.3k<br>(20 bytes/<br>30 msec) | | G.723.16.3k<br>(24 bytes/<br>30 msec) | | G.729A<br>(10 bytes/<br>10 msec) | |
|---|---|---|---|---|---|---|---|---|
| | Silence<br>Enable | Silence<br>Disable | Silence<br>Enable | Silence<br>Disable | Silence<br>Enable | Silence<br>Disable | Silence<br>Enable | Silence<br>Disable |
| 1 | 151.36K | 188.8K | 23.6K | 26.1K | 24.0K | 27.2K | 66.6K | 70.4K |
| 2 | 91.8K | 126.4K | 13.2K | 15.7K | 13.7K | 16.8K | 35.4K | 39.2K |
| 3 | | 105.6K | | 12.3K | | 13.3K | | 28.8K |
| 4 | | 95.2K | | | | | | 23.6K |
| 5 | | | | | | | | 20.5K |

As shown in Table 1, compression information which the VoIP signaling unit 110 provides to the traffic manager 210 of the switch/router 200 upon call establishment or termination varies with the compression technique (VoIP codec), the number of frames (multiframe), and silence suppression.

When a call is initiated between the IP network 350 and the PSTN 450 in order to carry voice and data, the VoIP media 120 performs appropriate media conversion for each network according to the compression information.

When the VoIP signaling unit 110 checks the available bandwidth information, which is provided by the traffic manager 210 of the switch/router 200 in real time, and determines that the newly generated call cannot be normally processed, the call bypass processor 130 performs bypass processing via the PSTN 450 under the control of the VoIP signaling unit 110.

Particularly, the call bypass processor 130 can be connected with the key phone 500 having a connection to an office line and/or an extension. With the key phone 500 connected in this manner, a user can make voice calls to others holding an IP terminal or a general telephone. The key phone is directly connected to an office line or to an extension by the call bypass processor 130.

The switch/router 200 includes the traffic manager 210 which manages the bandwidth according to transmitted or received traffic, and the traffic manager 210 includes a queue manager 220.

The traffic manager 210 uses both strict priority queuing (SPQ) and weight round robin (WRR) in order to process real-time data such as a VoIP traffic and general data such as a hypertext transfer protocol (HTTP) data, and dynamically sets and manages the VoIP bandwidth.

In other words, the traffic manager 210 manages the entire available bandwidth, and when the available bandwidth exceeds a bandwidth limit, traffic manager 210 notifies the VoIP call controller 100 of that information.

In response to receiving the latter information, the VoIP call controller 100 bypasses the newly requested call to a legacy trunk of an IP-private branch exchanger (PBX), and processes the call.

When the available bandwidth is obtained, the traffic manager 210 notifies the VoIP call controller 100 of the available bandwidth information so that VoIP call service can be provided.

The queue manager 220 performs queuing management in the traffic manager 210.

Specifically, the queue manager 220 uses SPQ to process real-time data such as VoIP traffic, and applies a weight to processing priority within a traffic management module so as to perform queue scheduling processing on other general data traffic in a round robin scheme.

The queuing management in the queue manager 220 will be described in detail with reference to FIG. 2.

As illustrated in FIG. 2, it is assumed that an output port ⓓ has a bandwidth of 10 Mbps, Q1 in ⓐ is a queue for VoIP traffic service, and Q2, Q3 and Q4 are queues for processing general data traffic.

First, a queue scheduler processes all data of Q1 by applying the SPQ method at ⓒ, and then differentially processes Q2 to Q4 according to a required weight at ⓑ.

When there is a remaining portion of the bandwidth (e.g., 10 Mbps) of the output port ⓓ after the data in Q1 is processed, data in Q2 to Q4 are sent to the output port.

Particularly, a bandwidth to be processed at Q1 (VoIP traffic data) by the scheduler of ⓒ, i.e., an SPQ-applied bandwidth is notified by the VoIP call controller 100 and dynamically set.

Accordingly, a bandwidth to be processed in the WRR can be relatively reset, resulting in effective traffic management.

Figure 3:
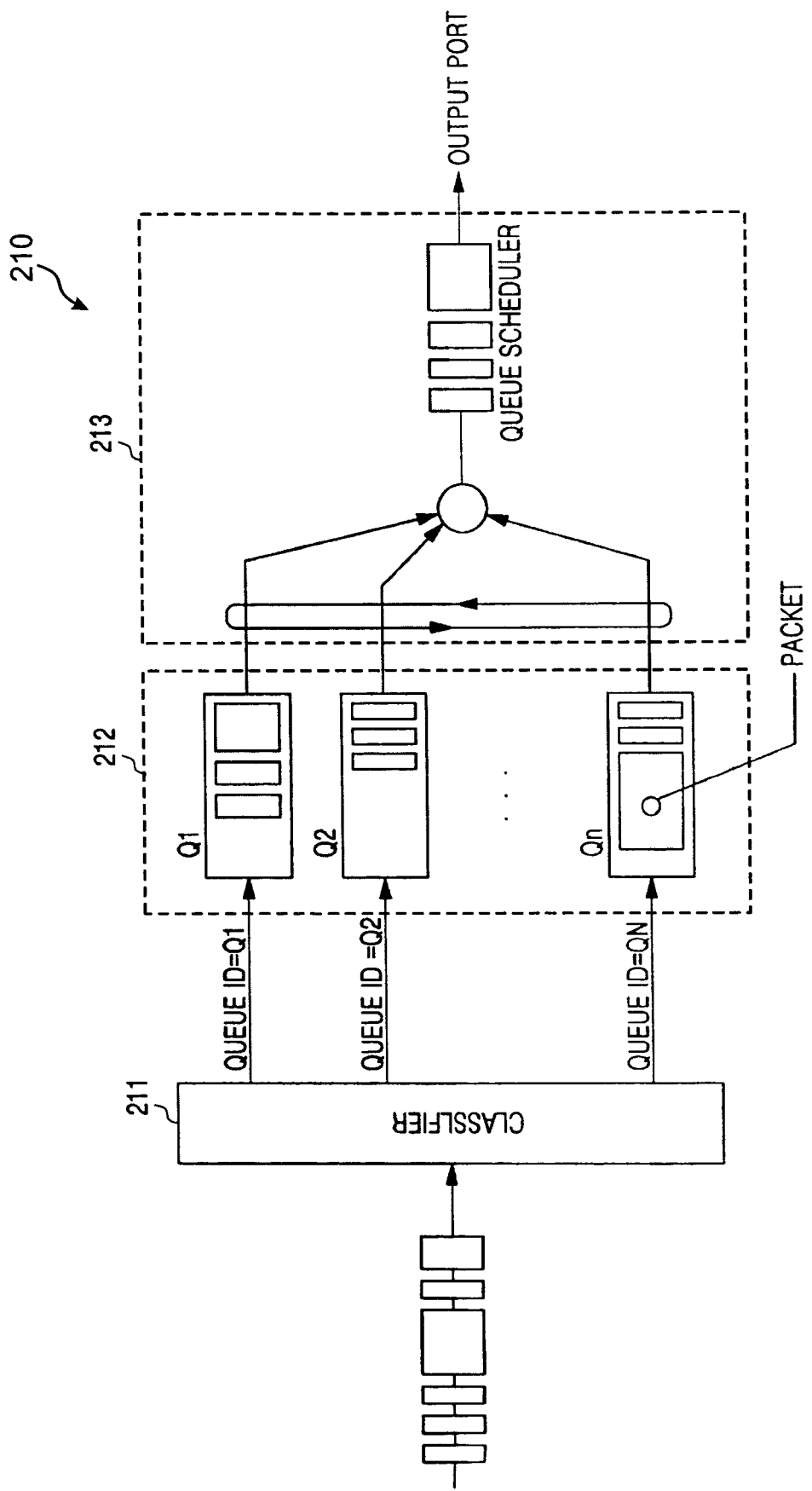
FIG. 3 illustrates the configuration of a traffic manager in a switch/router shown in FIG. 1.

FIG. 3 illustrates the configuration of a traffic manager in the switch/router shown in FIG. 1.

As illustrated in FIG. 3, the traffic manager 210 of the present invention includes a traffic classifier 211, a traffic buffer manager 212, and a traffic queue scheduler 213.

The traffic classifier 211 classifies data traffic according to data traffic characteristics, according to IP/port/protocol, or according to 802.1p/Q, differentiated services code point (DSCP) and type of service (ToS). In other words, the traffic classifier 211 selects data traffic for a different service in a subsequent processing operation.

The traffic buffer manager 212 stores the data traffic classified according to characteristics of the data traffic selected by the traffic classifier 211 in a corresponding queue.

The traffic queue scheduler 213 differentially schedules the data traffic according to a queuing algorithm in queues stored in the traffic buffer manager 212, and thereby carries out a priority process in order to send the data traffic. The traffic queue scheduler 213 sends data traffic by means of a bandwidth that can be processed by the switch/router 200.

Figure 4:
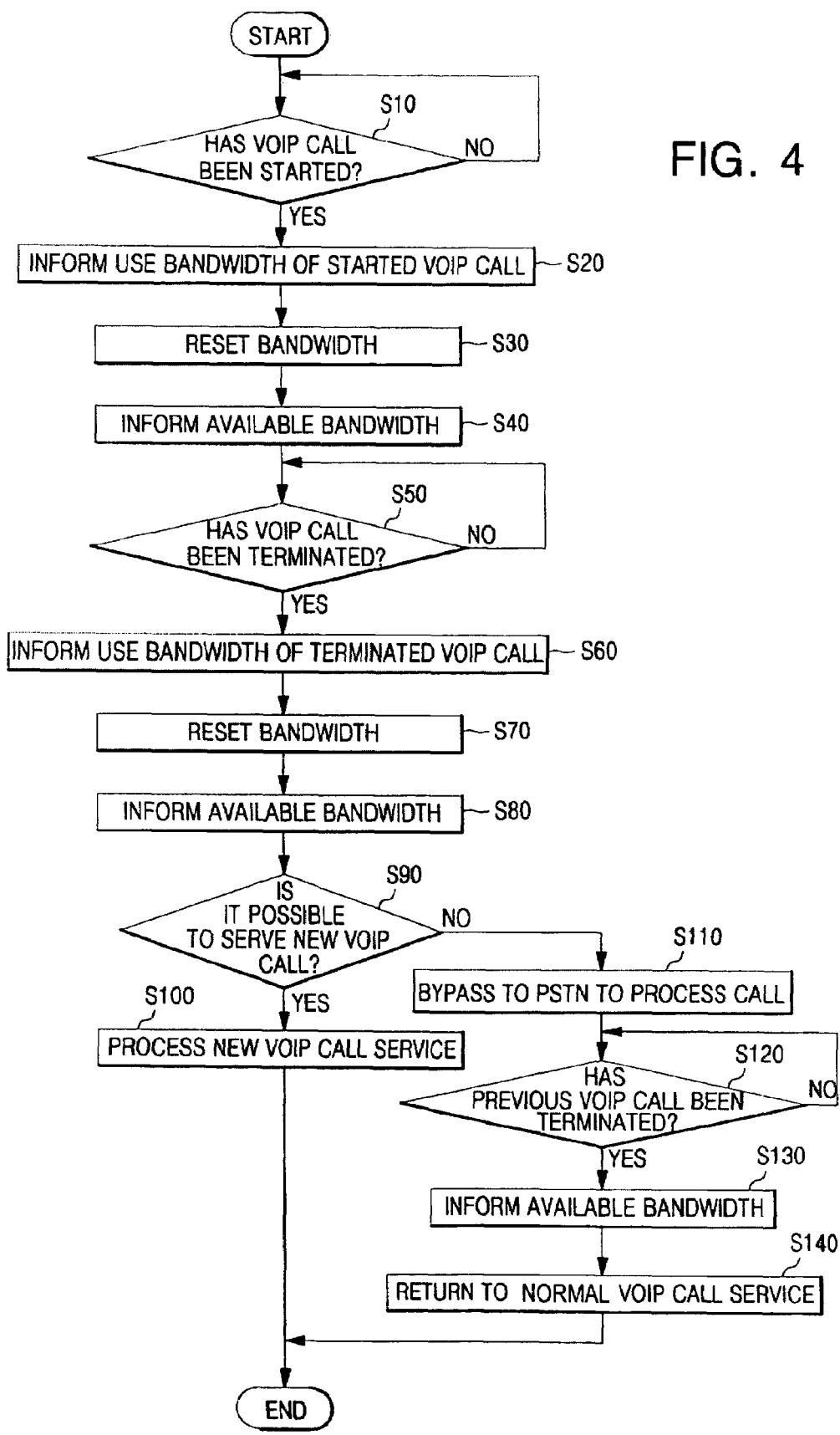
FIG. 4 is a flowchart of a bandwidth management method for guaranteeing QoS in a VoIP network according to an exemplary embodiment of the present invention.

FIG. 4 is a flowchart of a bandwidth management method for guaranteeing QoS in a VoIP network according to an exemplary embodiment of the present invention.

First, signaling unit 110 of VoIP call controller 100 determines whether a VoIP call is initiated in response to receiving a request for the VoIP call (S10).

Subsequently, when the VoIP call is initiated, the VoIP signaling unit 110 notifies the traffic manager 210 of switch/router 200 of a use bandwidth of the initiated VoIP call (S20).

In response to the notification, the traffic manager 210 of the switch/router 200 resets bandwidths for the SPQ and the WRR (S30), and then notifies the VoIP call controller 100 of available bandwidth (S40).

The VoIP signaling unit 110 then determines whether the VoIP call has been terminated (S50). When the VoIP call has been terminated, the VoIP signaling unit 110 notifies the traffic manager 210 of the switch/router 200 of the use bandwidth of the ended VoIP call (S60).

In response to that notification, the traffic manager 210 of the switch/router 200 resets bandwidths for the SPQ and WRR (S70), and then notifies the VoIP call controller 100 of available bandwidth (S80).

The VoIP signaling unit 110 then determines whether a VoIP call which is newly generated can be served using the available bandwidth reported by the traffic manager 210 (S90).

When the newly generated VoIP call can be served, the VoIP signaling unit 110 processes the new VoIP call normally (S100).

However, when the available bandwidth reported by the traffic manager 210 is not sufficient to provide newly generated VoIP call service, the VoIP signaling unit 110 bypasses the newly generated call via a legacy trunk to PSTN 450, and thereby processes the call (S110).

In bypassing the newly generated call via the PSTN 450, the VoIP signaling unit 110 determines whether a previous VoIP call has been terminated (S120).

When a previous VoIP call has been terminated, the VoIP signaling unit 110 notifies the traffic manager 210 of the termination information and is notified of available bandwidth by the traffic manager 210 (S130).

In response to that notification, the VoIP signaling unit 110 returns to the state in which VoIP call service can be normally provided (S140), and then provides normal VoIP call service for a newly generated call.

According to an exemplary embodiment of the present invention, when VoIP call service is provided, a bandwidth is dynamically set, and when the dynamically set bandwidth exceeds a bandwidth limit, a requested call is established via an IP-PBX legacy trunk. Accordingly, the bandwidth can be effectively used and QoS can be guaranteed.

Whereas the embodiments of the bandwidth management system and method for guaranteeing QoS in a VoIP network are illustrated and described, the present invention is not limited thereto, but can be applied to all communication systems that dynamically manage a bandwidth so as to guarantee QoS.

Although preferred embodiments of the present invention have been described in detail, it will be appreciated by those skilled in the art to which the present invention pertains that several modifications and variations can be made without departing from the spirit and scope of the present invention as defined in the appended claims. Accordingly, future variations of the embodiments of the present invention can be covered by the technique of the present invention.

What is claimed is:

1. A bandwidth management system for guaranteeing quality of service (QoS) in a voice over Internet protocol (VoIP) network, said system comprising:
    a call controller for providing use bandwidth information for establishing or terminating a call; and
    a traffic manager for resetting a bandwidth when the use bandwidth information is provided by the call controller, and for sending available bandwidth information to the call controller,
    wherein the call controller comprises a call bypass processor for bypassing a newly generated call to a legacy trunk and processing the call when the available bandwidth information sent by the traffic manager in real time exceeds a predetermined bandwidth limit.

2. The bandwidth management system of claim 1, wherein the call controller processes the newly generated call according to the available bandwidth information sent by the traffic manager in real time.

3. The bandwidth management system of claim 1, wherein the call controller further comprises a VoIP signaling unit for checking the available bandwidth information sent by the traffic manager to determine whether the newly generated call can be normally processed.

4. The bandwidth management system of claim 3, wherein the call controller further comprises a VoIP media for performing media conversion according to compression information provided by the VoIP signaling unit to the traffic manager.

5. The bandwidth management system of claim 1, wherein the call controller comprises a VoIP signaling unit for checking the available bandwidth information sent by the traffic manager to determine whether the newly generated call can be normally processed.

6. The bandwidth management system of claim 5, wherein the call controller further comprises a VoIP media for performing media conversion according to compression information provided by the VoIP signaling unit to the traffic manager.

7. The bandwidth management system of claim 1, wherein the traffic manager comprises:
    a traffic classifier for classifying data traffic inputted through an Internet protocol (IP) network according to at least one of data traffic characteristics, IP/port/protocol information, and type of service (ToS) information;
    a traffic buffer manager for storing the data traffic classified by the traffic classifier in a corresponding queue; and
    a traffic queue scheduler for differentially scheduling the data traffic stored in the queue of the traffic buffer manager according to a queuing algorithm, and for sending the data traffic to an output port according to a given priority.

8. The bandwidth management system of claim 1, wherein the traffic manager includes a queue manager for processing real-time data traffic using a strict priority queuing (SPQ) method, and for processing general data traffic using a weight round robin (WRR) method.

9. A bandwidth management method for guaranteeing quality of service (QoS) in a voice over Internet protocol (VoIP) network, the method comprising the steps of:
    providing, at a call controller, use bandwidth information used for establishing or terminating a call;
    at a traffic manager, resetting a bandwidth when the use bandwidth information is provided, and providing available bandwidth information; and
    bypassing, at the call controller, a newly generated call to a legacy trunk so as to process the call when the available bandwidth provided in real time exceeds a predetermined bandwidth limit.

10. The bandwidth management method of claim 9, further comprising the step of:
    processing, at the call controller, the newly generated call according to the available bandwidth information provided in real time.

11. The bandwidth management method of claim 9, further comprising the step of checking, at the call controller, the available bandwidth information to determine whether the newly generated call can be normally processed.

12. The bandwidth management method of claim 11, further comprising the step of, performing, at the call controller, media conversion according to compression information.

13. The bandwidth management method of claim 9, wherein the step of bypassing the newly generated call includes processing, at the call controller, the newly generated call by a normal call control service method when a call that has been previously served is terminated, thereby extending the available bandwidth.

14. The bandwidth management method of claim 9, further comprising the step of checking, at the call controller, the available bandwidth information to determine whether the newly generated call can be normally processed.

15. The bandwidth management method of claim 14, further comprising the step of performing, at the call controller, media conversion according to compression information.

* * * * *